(12) United States Patent
Karri et al.

(10) Patent No.: US 11,780,171 B2
(45) Date of Patent: Oct. 10, 2023

(54) ARTIFICIAL INTELLIGENCE-BASED 3D PRINTING FOR WASTE DISPOSAL MANAGEMENT

(71) Applicant: International Business Machines Corporation, Armonk, NY (US)

(72) Inventors: Venkata Vara Prasad Karri, Visakhapatnam (IN); Sarbajit K Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 17/100,865

(22) Filed: Nov. 21, 2020

(65) Prior Publication Data

US 2022/0161497 A1 May 26, 2022

(51) Int. Cl.
*B29C 64/393* (2017.01)
*G06F 16/29* (2019.01)
(Continued)

(52) U.S. Cl.
CPC ............ *B29C 64/393* (2017.08); *B33Y 50/02* (2014.12); *B33Y 80/00* (2014.12); *B64C 39/024* (2013.01);
(Continued)

(58) Field of Classification Search
CPC .................................................. B29C 64/393
See application file for complete search history.

(56) References Cited

U.S. PATENT DOCUMENTS 5,097,750 A * 3/1992 Oldham .................... B65F 1/14
55/467
10,095,231 B2 10/2018 Gordon
(Continued)

FOREIGN PATENT DOCUMENTS

KR 20190105530 A 9/2019
WO 2019056102 A1 3/2019

OTHER PUBLICATIONS

"Method and system for digital twin based optimum 3D printed packages considering predicted handling, environmental condition and surrounding context during delivery", An IP.com Prior Art Database Technical Disclosure, Disclosed Anonymously, IP.com No. IPCOM000261530D, IP.com Electronic Publication Date: Mar. 12, 2020, 5 pages.
(Continued)

*Primary Examiner* — Suresh Suryawanshi
(74) *Attorney, Agent, or Firm* — Michael A. Petrocelli

(57) ABSTRACT

Artificial intelligence-based 3D printing for waste disposal management includes collecting, by one or more processors, data corresponding to a waste disposal site from a plurality of data acquisition sources. Based on the collected data, determine properties of waste disposed in a waste disposal container located in the waste disposal site and a waste distribution pattern associated with waste accumulation in the waste disposal site. Weather data corresponding to a geographic location of the waste disposal site is obtained by the one or more processors, and based on the weather data and the waste distribution pattern a vulnerability index is calculated for the waste disposal site. In response to the vulnerability index exceeding a predefined threshold, a request is sent to a 3D printer for printing a protective cover for the waste disposal container according to the waste
(Continued)

distribution pattern for preventing waste spreading outside the waste disposal container.

20 Claims, 6 Drawing Sheets

(51) Int. Cl.
  *G06N 20/00*    (2019.01)
  *G06Q 10/30*    (2023.01)
  *B33Y 50/02*    (2015.01)
  *G01W 1/10*    (2006.01)
  *B64C 39/02*    (2023.01)
  *B33Y 80/00*    (2015.01)
  *G16Y 10/75*    (2020.01)
  *B33Y 10/00*    (2015.01)
  *B29L 31/56*    (2006.01)
  *B64U 101/00*    (2023.01)

(52) U.S. Cl.
  CPC ............... *G01W 1/10* (2013.01); *G06F 16/29* (2019.01); *G06N 20/00* (2019.01); *G06Q 10/30* (2013.01); *B29L 2031/565* (2013.01); *B33Y 10/00* (2014.12); *B64U 2101/00* (2023.01); *G16Y 10/75* (2020.01)

(56) References Cited

U.S. PATENT DOCUMENTS

| | | | |
|---|---|---|---|
| 10,245,786 B2 | 4/2019 | Thresh | |
| 2014/0379588 A1* | 12/2014 | Gates | G06Q 10/0631 |
| | | | 705/308 |
| 2017/0124533 A1* | 5/2017 | Rodoni | G06Q 30/0611 |
| 2018/0365660 A1* | 12/2018 | Collins | G06F 16/27 |
| 2020/0082354 A1* | 3/2020 | Kurani | G01K 1/026 |
| 2020/0406508 A1* | 12/2020 | White | B29C 33/04 |

OTHER PUBLICATIONS

Mell et al., "The NIST Definition of Cloud Computing", National Institute of Standards and Technology, Special Publication 800-145, Sep. 2011, 7 pages.

Solano Meza, et al., "Predictive analysis of urban waste generation for the city of Bogota, Colombia, through the Implementation of decision trees-based machine learning, support vector machines and artificial neural networks", Heliyon, vol. 5, Issue 11, Nov. 2019, 11 pages, <https://www.sciencedirect.com/science/article/pii/s2405844019364709>.

* cited by examiner

ARTIFICIAL INTELLIGENCE-BASED 3D PRINTING FOR WASTE DISPOSAL MANAGEMENT

BACKGROUND

The present invention generally relates to the field of environmental cleanup and management, and more particularly to a method, system, and computer program product for managing waste disposal using artificial intelligence based 3D printing.

Waste management is an area of critical concern worldwide. Human activities generate large amounts of waste, and the way this waste is handled, stored, collected and disposed can pose risks to the environment and to public health. This is particularly true in developing countries in which low collection coverage, unavailable transport services, and a lack of suitable treatment and disposal facilities are responsible for unsatisfactory solid waste management, leading to water, land and air pollution, and for putting people and the environment at risk.

SUMMARY

Shortcomings of the prior art are overcome and additional advantages are provided through the provision of a computer-implemented method for waste disposal management that includes collecting, by one or more processors, data corresponding to a waste disposal site from a plurality of data acquisition sources. Based on the collected data, the one or more processors determine properties of waste disposed in a waste disposal container located in the waste disposal site and a waste distribution pattern associated with waste accumulation in the waste disposal site. The one or more processors collect weather data corresponding to a geographic location of the waste disposal site from external data sources. Based on the weather data and the waste distribution pattern, the one or more processors calculate a vulnerability index for the waste disposal site. In response to the vulnerability index exceeding a predefined threshold, the one or more processors send a request to a 3D printer for printing a protective cover for the waste disposal container according to, at least, the waste distribution pattern for preventing disposed waste spreading outside the waste disposal container.

Another embodiment of the present disclosure provides a computer program product for waste disposal management, based on the method described above.

Another embodiment of the present disclosure provides a computer system for waste disposal management, based on the method described above.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
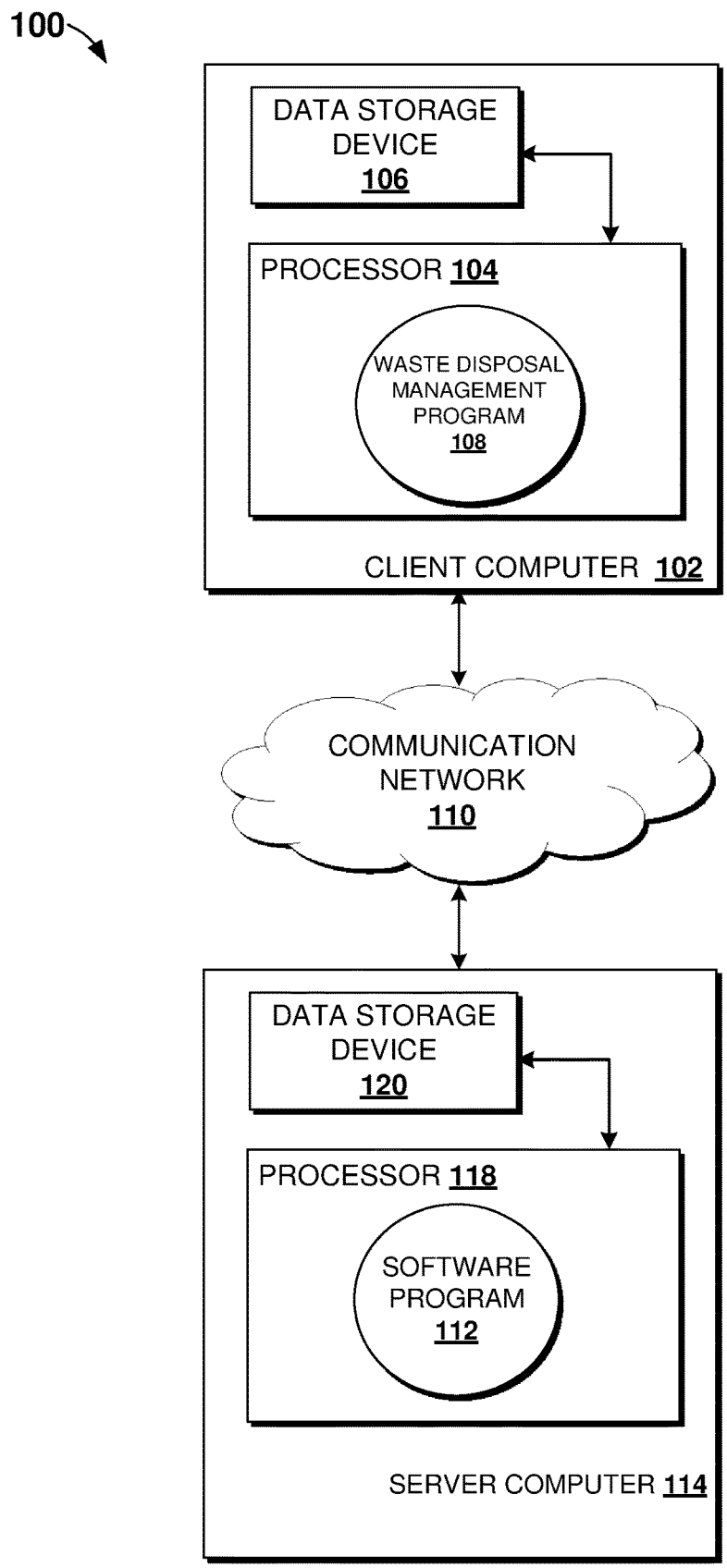
FIG. 1 is a block diagram illustrating a networked computer environment, according to an embodiment of the present disclosure.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Inadequate collection and uncontrolled disposal of waste can lead to health risks and environmental pollution, among other potential hazards. According to the U.N. Environment Programme (UNEP), every year, an estimated 11.2 billion tons of solid waste is collected worldwide and the decay of the organic portion of this waste is contributing about 5 percent of global greenhouse gas emissions. Of all the waste streams, waste from electrical and electronic equipment containing new and complex hazardous substances presents the fastest-growing challenge in both developed and developing countries.

A common problem related to waste disposal is the overflowing of waste from disposal containers or bins generally caused by delays in collection services, insufficient vehicles for transportation, and/or lack of planning by corresponding authorities. The excess waste may spread out to areas surrounding the waste disposal containers becoming potential sources of contamination. Moreover, wind and stormwater may transport improperly disposed waste into rivers, streams, lakes and creeks, and from there to the ocean. In some instances, overflowing waste disposal containers may be located close to places highly vulnerable to pollution such as playgrounds or schools. Also, waste disposal containers in certain locations (e.g., hospitals, clinics, etc.) may contain biohazardous or infectious waste (such as blood, body fluids, etc.) that could be contaminated with potentially infectious agents or other materials that are deemed a threat to public health or the environment. Another potential contamination source may include construction sites in which large amount of solid waste from building materials (e.g., gypsum sheets, plaster, etc.) can be generated.

Therefore, embodiments of the present invention provide a method, system, and computer program product for waste disposal management using artificial intelligence (AI) based 3D printing. The following described exemplary embodiments provide a system, method, and computer program product to, among other things, collect data from a plurality of data acquisition sources to determine waste disposal characteristics associated with a waste disposal site, calculate a waste distribution pattern associated with waste accumulation in the waste disposal site, obtain a weather forecast corresponding to a geographic location of the waste disposal site, calculate a vulnerability index based on the weather forecast and the waste distribution pattern, and based on the vulnerability index, send a request to a 3D printer for printing a cover for a waste disposal container in the waste disposal site according to the waste distribution pattern.

Thus, the present embodiments have the capacity to improve the technical field of environmental cleanup and management by providing information regarding a waste disposal location, waste distribution, and type of waste disposed at or near sensible locations (e.g., hospitals, schools, rivers, lakes, and the like) together with weather conditions to generate an action plan that includes determining whether a cover, lid and/or receptacle is needed to prevent excess waste to spread outside the waste disposal containers, and create a suitable protective cover for the waste disposal container using an artificial intelligence enabled 3D printing system with self-moving capabilities.

Referring now to FIG. 1, an exemplary networked computer environment 100 is depicted, according to an embodiment of the present disclosure. FIG. 1 provides only an illustration of one embodiment and does not imply any limitations with regard to the environments in which different embodiments may be implemented. Many modifications to the depicted environment may be made by those skilled in the art without departing from the scope of the invention, as recited by the claims.

The networked computer environment 100 may include a client computer 102 and a communication network 110. The client computer 102 may include a processor 104, that is enabled to run a waste disposal management program 108, and a data storage device 106. Client computer 102 may be, for example, a mobile device, a telephone (including smartphones), a personal digital assistant, a netbook, a laptop computer, a tablet computer, a desktop computer, or any type of computing devices capable of accessing a network.

The networked computer environment 100 may also include a server computer 114 with a processor 118, that is enabled to run a software program 112, and a data storage device 120. In some embodiments, server computer 114 may be a resource management server, a web server or any other electronic device capable of receiving and sending data. In another embodiment, server computer 114 may represent a server computing system utilizing multiple computers as a server system, such as in a cloud computing environment.

The waste disposal management program 108 running on client computer 102 may communicate with the software program 112 running on server computer 114 via the communication network 110. As will be discussed with reference to FIG. 4, client computer 102 and server computer 114 may include internal components and external components.

The networked computer environment 100 may include a plurality of client computers 102 and server computers 114, only one of which is shown. The communication network 110 may include various types of communication networks, such as a local area network (LAN), a wide area network (WAN), such as the Internet, the public switched telephone network (PSTN), a cellular or mobile data network (e.g., wireless Internet provided by a third or fourth generation of mobile phone mobile communication), a private branch exchange (PBX), any combination thereof, or any combination of connections and protocols that will support communications between client computer 102 and server computer 114, in accordance with embodiments of the present disclosure. The communication network 110 may include wired, wireless or fiber optic connections. As known by those skilled in the art, the networked computer environment 100 may include additional computing devices, servers or other devices not shown.

Plural instances may be provided for components, operations, or structures described herein as a single instance. Boundaries between various components, operations, and data stores are somewhat arbitrary, and particular operations are illustrated in the context of specific illustrative configurations. Other allocations of functionality are envisioned and may fall within the scope of the present invention. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present invention.

Figure 2:
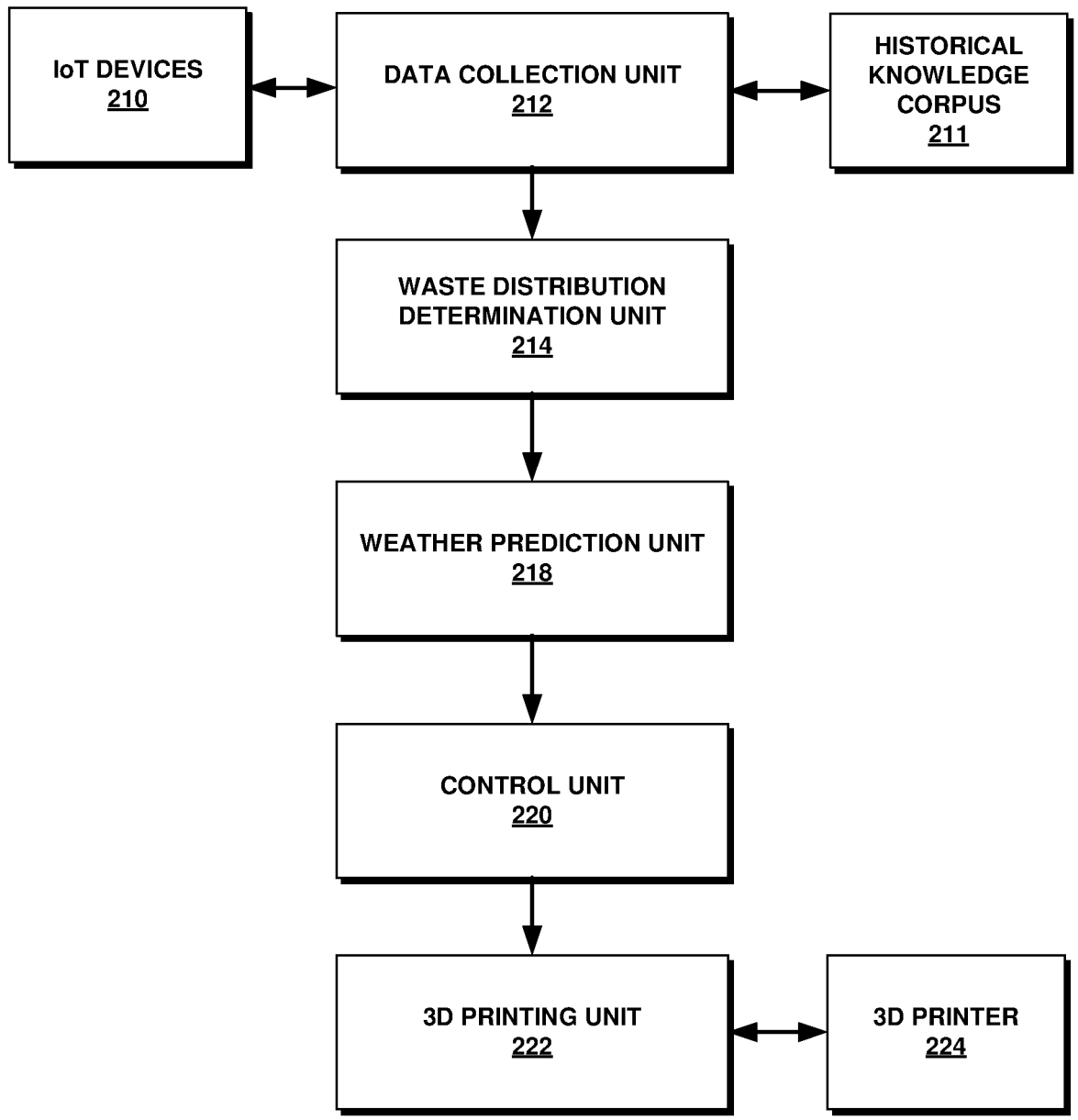
FIG. 2 depicts an artificial intelligence-based system for waste disposal management, according to an embodiment of the present disclosure.

Referring now to FIG. 2, a system 200 for waste disposal management using artificial intelligence enabled 3D printing is shown, according to an embodiment of the present disclosure. The system 200 can be implemented in, for example, the client computer 102 of FIG. 1.

In this embodiment, the system 200 includes a data collection unit 212 communicatively connected to a plurality of Internet of Things (IoT) devices (herein after "IoT devices") 210, a waste distribution determination unit 214, a weather prediction unit 218, a control unit 220, and a 3D printing unit 222 communicatively connected to a 3D printer 224.

The data collection unit 212 monitors and collects information from different data acquisition sources located at or near a waste disposal location or site. In this embodiment, the data acquisition sources include the plurality of IoT devices 210.

The IoT devices 210 may include a camera or camera system available in the waste disposal location. In some embodiments, the IoT devices 210 may include a smart city IoT sensors and advanced analytics network used to improve performance with regard to city services and other aspects of city life. In embodiments in which (smart) cameras are not available at or near the waste disposal location, other data acquisition sources can be used to collect waste disposal information associated with the waste disposal site including, for example, unmanned aerial vehicles (UAV), satellite-based systems, and the like.

In an embodiment, the data acquisition sources may also include an automated voice answering and data collection system that can be accessed by a person to report waste spillage including sending an audio, image and/or video associated with the waste disposal site. Based on the received information, the system 200 generates an appropriate response.

Examples of waste disposal sites within urban areas may include hospitals, schools, playgrounds, parks, and the like. Additional examples of waste disposal sites to be monitored for inadequate waste disposal may include landforms (e.g., mountains, natural landmarks, etc.) and/or water bodies (e.g., rivers, oceans, lakes, etc.) at risk of being polluted, or any polluted site that requires maintenance and active monitoring. It may be understood that embodiments of the present disclosure can be implemented in different locations where waste disposal can occur.

The collected information includes a plurality of images corresponding to the waste disposal location. It should be noted that the monitoring of a waste disposal location includes any waste disposal container available in the disposal site. Examples of data extracted from the plurality of images captured from the IoT devices 210 may include properties or characteristics of the disposed waste such as an amount of waste being disposed in the waste disposal location, a frequency of waste disposal in the waste disposal location (e.g., daily, weekly, etc.), and/or an amount of waste located in any surrounding areas that can be a potential source of contamination, among other properties of the disposed waste and waste disposal location. Collected information regarding the waste disposal site can also include geographic coordinates, temporal information (e.g., from image timestamp), a class and a size of waste disposed within containers or bins and in areas surrounding the waste disposal site.

In an embodiment, a historical knowledge corpus 211 can be used by the data collection unit 212 to identify different waste properties including different types (i.e., class) of waste and waste disposal statistics. The historical knowledge corpus 211 is a database of chronological waste disposal data associated with one or more geographic locations. Using the historical knowledge corpus 211, the data collection unit 212 of the system 200 can determine, for example, whether the disposed waste can spread disease, attract animals or birds, and/or contain hazardous substances. The historical knowledge corpus 211 may also include a history of geographical/demographic data and associated waste generation patterns.

Examples of waste types may include, but is not limited to, plastic, municipal solid waste, hazardous materials, medical and industrial waste, etc. Known image processing techniques and data analytics can be used to extract information from the collected information.

Based on the collected information, the waste distribution determination unit 214 identifies a waste distribution pattern associated with waste accumulation in the waste disposal site. The waste distribution pattern allows recognizing areas at higher risk of inadequate waste disposal that can become a source of contamination. For example, the waste distribution pattern associated with a waste disposal container located near a hospital indicates that there is a higher risk of waste overflowing by the end of the day. In another example, the waste distribution pattern may show waste already spreading around the waste disposal container at a certain time.

It should be noted that waste composition differs across income levels, reflecting varied patterns of consumption. Thus, geographical/demographic data and associated consumption patterns are considered or reflected in the determination of the waste distribution pattern. Known data analytics and machine learning algorithms can be used by the system 200 to determine the waste distribution pattern.

The weather prediction unit 218 collects weather data associated with a geographic location of the waste disposal site. The weather data can be collected from external data sources including, for example, The Weather Channel®. The weather data includes a weather forecast for the waste disposal location. The collected weather data together with the waste distribution pattern obtained by the waste distribution determination unit 214 is sent to the control unit 220 in which a vulnerability index is determined for the waste disposal location.

The vulnerability index for the waste disposal location is determined using, at least in part, the waste distribution pattern and the weather data. The vulnerability index indicates a possibility of unfavorable weather conditions causing the waste disposal location becoming a source of contamination for nearby areas. For example, the waste distribution pattern for a waste disposal site located near a school shows that the waste disposal container is at full capacity and solid waste is exposed, while the weather forecast predicts rain with strong winds. In this situation, the vulnerability index associated with the waste disposal site is high.

In some embodiments, a predetermined (vulnerability) threshold may be set by the control unit 220. In response to the vulnerability index associated with a waste disposal location exceeding the predetermined threshold, the control unit 220 recognizes the waste disposal location as requiring immediate attention. The predetermined threshold may be provided, for example, by local authorities and may be selected based on a geographic location of the waste disposal site (e.g., waste disposal site is located near a hospital, school, historic landmark, etc.).

In some embodiments, the waste disposal containers located in the waste disposal site can include one or more sensors placed, for example, in waste receptacles to measure fill levels and notify the control unit 220 when containers are ready to be emptied or near full capacity.

When the vulnerability index for a waste disposal location is high or exceeds the predetermined threshold, the control unit 220 may send a request to the 3D printing unit 222 to generate a suitable protective cover or lid for the waste disposal container in the waste disposal location. Characteristics of the protective cover (e.g., material, shape, size, etc.) are selected according to the determined waste distribution pattern such that it can substantially cover the disposed waste and prevent waste overflow during unfavorable weather conditions. In some embodiments, a 3D print spray can be used to contain spilled waste.

In response to the request, the 3D printing unit 222 sends a request to the 3D printer 224 for printing the protective cover for the waste disposal container. As known by those skilled in the art, 3D printing or additive manufacturing is the process of converting a digital model into a solid three-dimensional object. In an embodiment, the 3D printing is performed at or near the waste disposal container in a way such that the protective cover can then be positioned on the waste disposal container by waste removal robots. In such embodiments, the 3D printer 224 performs modular printing at or near the waste disposal location. In some embodiments, the 3D printer 224 can be a robotic 3D printer with self-moving and printing capabilities.

If the system 200 identifies the waste disposal location as a permanent waste disposal site, then the control unit 220 stores the waste disposal location as a permanent disposal site and the 3D protective structure can be reused. Conversely, if the system 200 identifies the waste disposal location as a temporary waste disposal site, the control unit 220 stores this information and 3D printing is performed only one time.

According to an embodiment, the system 200 can determine whether a temporary or permanent type of protective covering is needed for the waste disposal location according to predicted weather conditions. For example, if the weather data predicts rain with high winds for several days, the system 200 determines that a strong (permanent) closing is needed and more material can be used to create the protective cover for this location. Conversely, if weather conditions are less severe (e.g., shorter rain periods with no wind), the system 200 may determine that a temporary protective cover is sufficient and can be generated using less raw materials. By doing this, the system 200 may prevent wasting 3D printing material.

Thus, by using a 3D printer for creating modular printing in close proximity to a waste disposal site, the disposed waste can be handled in a modular fashion. Additionally, the system 200 is capable of deciding whether permanent or temporary covering is to be created for proper management of the disposed waste based on the determined waste distribution pattern.

In some embodiments, the system 200 may determine that a waste disposal container is already overflowing and waste is spreading to surrounding areas. In these cases, the control unit 220 may, based on the vulnerability index and determined weather conditions, notify the respective authorities and/or send a request to, for example, scavenger robots or UAVs to perform waste collection in the waste disposal site.

Figure 3:
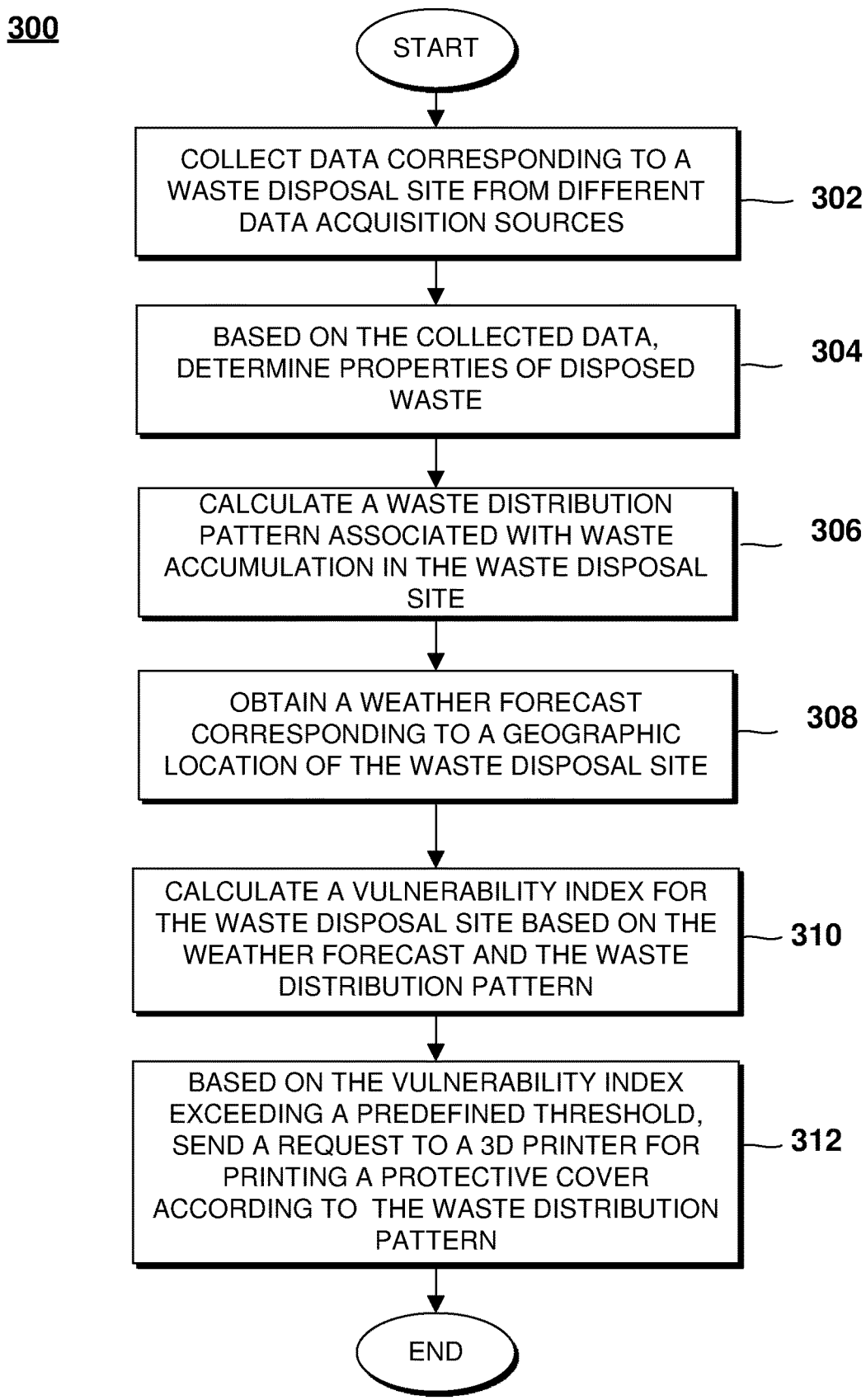
FIG. 3 depicts a flowchart illustrating the steps of a computer-implemented method for waste disposal management using artificial intelligence enabled 3D printing, according to an embodiment of the present disclosure.

Referring now to FIG. 3, a flowchart illustrating the steps of a computer-implemented method for waste disposal management using artificial intelligence-based 3D printing is shown, according to an embodiment of the present disclosure.

The process starts at step 302 with the collection of data corresponding to a waste disposal site from different data acquisition sources. According to an embodiment, the data acquisition sources are located at or near the waste disposal site. The data acquisition sources can record information regarding one or more waste disposal containers located in the waste disposal site. In an embodiment, the data acquisition sources may include, for example, a camera o camera system available in the waste disposal site. In another embodiment, the data acquisition sources may include a plurality of IoT devices (e.g., IoT devices 210 of FIG. 2). In some embodiments, the IoT devices 210 may include a smart city IoT sensors and advanced analytics network. In embodiments in which (smart) cameras are not available on or near the waste disposal location, the data acquisition sources may include UAVs, satellite-based systems, and the like. The collected data corresponds to a plurality of images of the waste disposal site and its surroundings.

At step 304, the plurality of images are analyzed using known image processing techniques and data analytics to determine a set of properties associated with waste disposed in at least one waste disposal container located in the waste disposal site. Exemplary properties or characteristics associated with the waste disposed in the waste disposal site include, but are not limited to, an amount of waste being disposed in the waste disposal site, a frequency of waste disposal in the waste disposal location, an amount of waste located in any surrounding areas that can be a potential source of contamination, geographic coordinates, temporal information, and a class and a size of the waste disposed within the waste disposal container and in areas surrounding the waste disposal site.

It should be noted that a historical knowledge corpus, such as the historical knowledge corpus 211 of FIG. 2, is used to identify the class or type of waste disposed within the waste disposal containers located in the waste disposal site, as explained above with reference to FIG. 2. Once the set of properties associated with the waste disposal site are determined, the process continues at step 306 with the calculation of a waste distribution pattern associated with waste accumulation in the waste disposal containers.

It should be noted that understanding behavioral patterns in the generation of waste is a critical component for efficient collection, and to design incentives that encourage recycling and composting. Thus, the waste distribution pattern is determined taking into account factors that affect the amount of generated waste including, for example, geographical location, seasonal fluctuation, collection system, onsite process, people's food habits, economic conditions, recovery and reuse boundaries, existing laws, and people's cultural conditions, public's lifestyle, temperature, annual precipitation averages, a lack of funds for sanitation, insufficient quantity of vehicles, etc. Known data analytics and machine learning algorithms can be used to determine the waste distribution pattern.

By determining the waste distribution pattern, waste disposal containers at higher risk of overflowing and being affected during unfavorable weather conditions (e.g., rain, wind, etc.) can be identified. Additionally, the waste distribution pattern may indicate whether a protective cover or lid is needed for the waste disposal container. It should be noted that, in some embodiments, the waste disposal containers located in the waste disposal site may include one or more sensors to measure fill levels (e.g., smart bins).

At step 308, weather data corresponding to a geographic location of the waste disposal site can be obtained from external data sources. The weather data may include a weather forecast for the waste disposal site. At step 310, a vulnerability index for the waste disposal site is calculated based on the waste distribution pattern and the weather data. According to an embodiment, the vulnerability index indicates a possibility of the waste disposal site becoming a source of contamination for nearby areas in the presence of unfavorable weather conditions. A predetermined threshold set by, for example, municipal authorities, can be used to determine whether the waste disposal site is a potential source of contamination, as explained above.

At step 312, based on the vulnerability index exceeding the predefined threshold, a request is sent to a 3D printer (e.g., 3D printer 224 of FIG. 2) for printing a protective cover for the waste disposal container according to, at least in part, the waste distribution pattern. The protective cover prevents disposed waste spreading outside the waste disposal container. According to an embodiment, The 3D printing is conducted in a modular fashion at or near the waste disposal container such that the protective cover is positioned on the waste disposal container by waste removal robots. The 3D printer may include, for example, a robotic 3D printer with self-moving and printing capabilities.

Therefore, embodiments of the present disclosure provide a method, system and computer program product to, among other things, generate in real-time a protective cover for a waste disposal container identified as a potential source of contamination. AI-based modular 3D printing can be performed at the waste disposal site to create a containment mechanism to keep waste inside the disposal containers during extreme weather conditions thereby preventing contaminated waste from being carried to other areas. Additionally, the proposed embodiments may improve efficiency of collection processes by providing an automated way to monitor waste disposal sites and reduce waste overflow from waste disposal containers during unfavorable weather conditions.

Embodiments of the present disclosure may also provide a way to decide whether a permanent or temporary covering is to be created for proper management of the disposed waste based on the waste distribution patter associated with a specific location. Additionally, embodiments of the present disclosure, may use smart bins to communicate corresponding authorities that the bins are full, the smart bins can be integrated with the weather prediction unit to perform prioritization based on the sensitivity of a geographic location in which the bins are located (e.g., near a hospital or a school, or a place with high waste footprints). Further, embodiments of the present disclosure, use a historical knowledge corpus to determine waste disposal trends, determine a waste distribution pattern, and create a protective cover around the disposed waste for effective waste disposal management.

Figure 4:
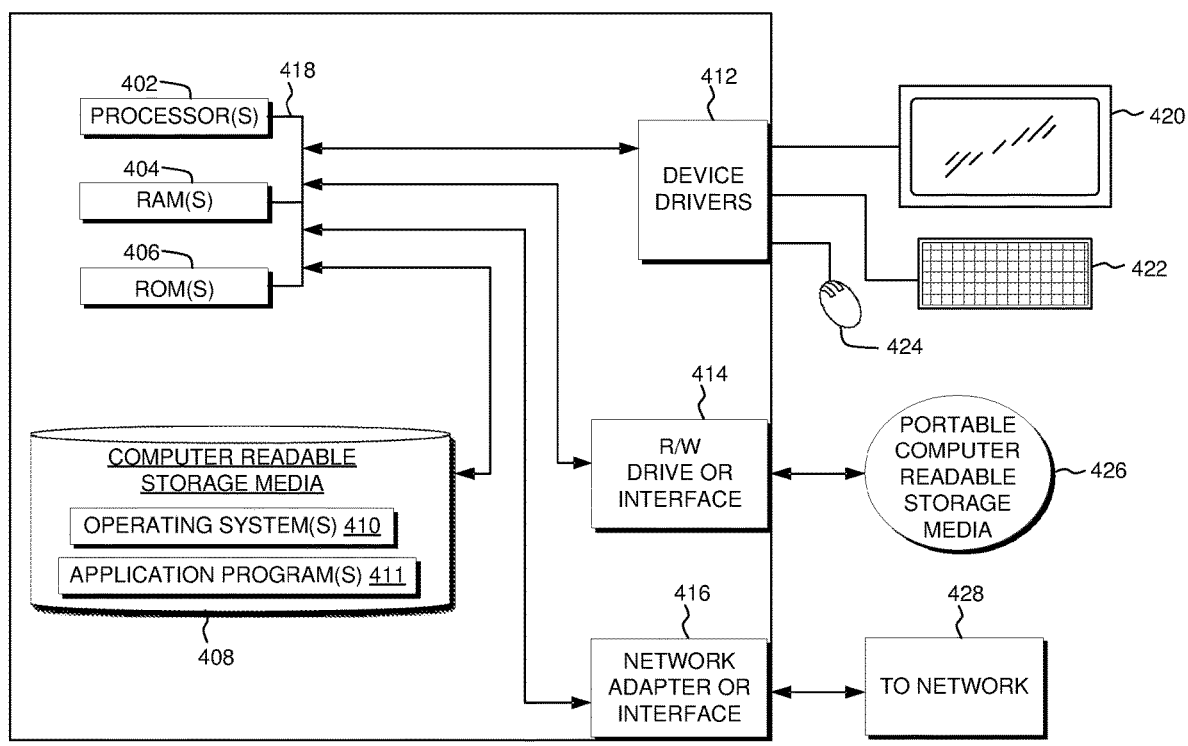
FIG. 4 is a block diagram of internal and external components of a computer system, according to an embodiment of the present disclosure.

Referring now to FIG. 4, a block diagram of components of client computer 102 and server computer 114 of networked computer environment 100 of FIG. 1 is shown, according to an embodiment of the present disclosure. It should be appreciated that FIG. 4 provides only an illustration of one implementation and does not imply any limitations regarding the environments in which different embodiments may be implemented. Many modifications to the depicted environment may be made.

Client computer 102 and server computer 114 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411 are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Client computer 102 and server computer 114 may also include a R/W drive or interface 414 to read from and write to one or more portable computer readable storage media 426. Application programs 411 on client computer 102 and server computer 114 may be stored on one or more of the portable computer readable storage media 426, read via the respective R/W drive or interface 414 and loaded into the respective computer readable storage media 408.

Client computer 102 and server computer 114 may also include a network adapter or interface 416, such as a TCP/IP adapter card or wireless communication adapter (such as a 4G wireless communication adapter using OFDMA technology) for connection to a network 428. Application programs 411 on client computer 102 and server computer 114 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Client computer 102 and server computer 114 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may include hardware and software (stored on computer readable storage media 408 and/or ROM 406).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
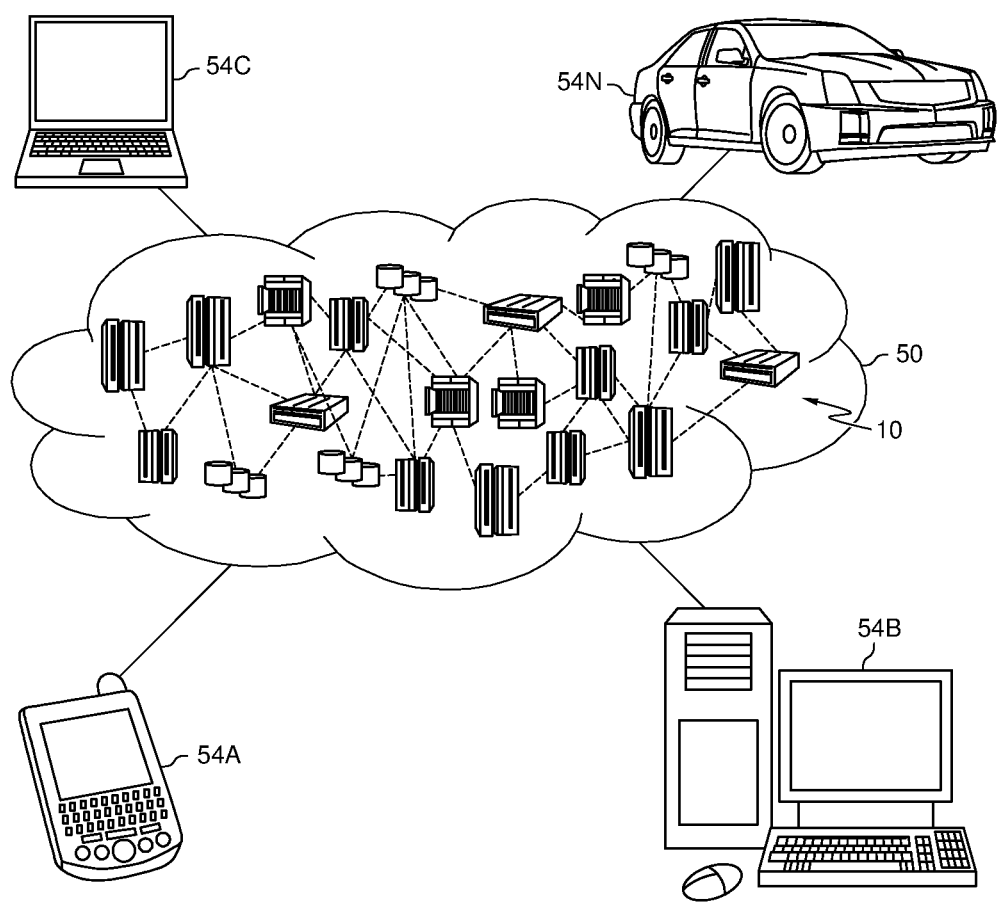
FIG. 5 is a block diagram of an illustrative cloud computing environment, according to an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
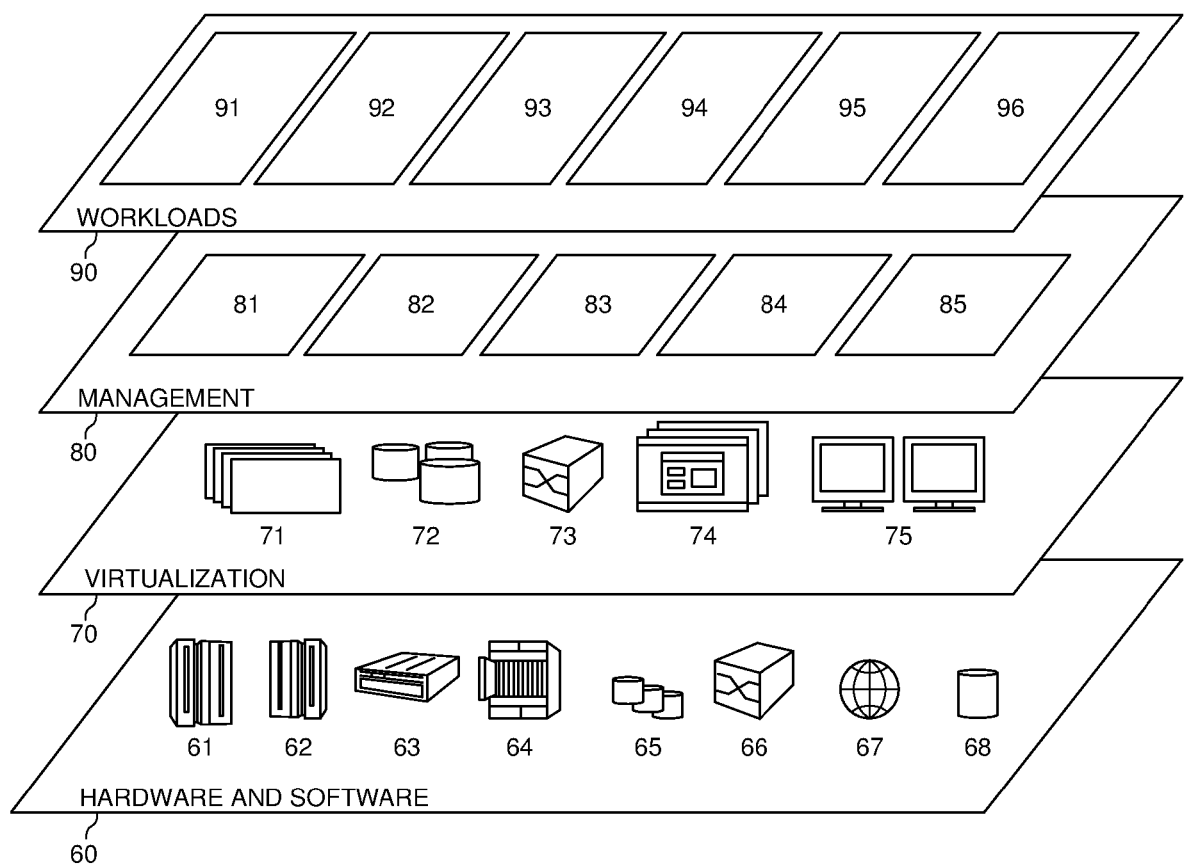
FIG. 6 is a block diagram of functional layers of the illustrative cloud computing environment of FIG. 5, according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system for waste management using artificial intelligence-based 3D printing 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for waste disposal management, comprising:
    collecting, by one or more processors, data corresponding to a waste disposal site from a plurality of data acquisition sources;
    based on the collected data, determining, by the one or more processors, properties of waste disposed in a waste disposal container located in the waste disposal site;
    determining, by the one or more processors, a waste distribution pattern associated with waste accumulation in the waste disposal site, the waste distribution pattern being determined based, at least in part, on the determined properties of the disposed waste, geographic data, demographic data, and consumption patterns associated with the waste disposal site;
    obtaining, by the one or more processors, weather data corresponding to a geographic location of the waste disposal site;
    based on the waste distribution pattern and the obtained weather data indicating a defined weather condition, calculating, by the one or more processors, a vulnerability index for the waste disposal site, the vulnerability index indicating a likelihood of the waste disposed in the waste disposal container overflowing due to the defined weather condition and becoming a contamination source for the waste disposal site; and
    based on the vulnerability index exceeding a predefined threshold, sending, by the one or more processors, a request to a 3D printer for printing a protective cover for the waste disposal container according to, at least in part, the waste distribution pattern, the protective cover preventing the disposed waste spreading outside the waste disposal container.

2. The method of claim 1, wherein the plurality of data acquisition sources comprises at least one of a camera system located at or near the waste disposal site, Internet of Things devices located at or near the waste disposal site, an unmanned aerial vehicle, and satellite-based system.

3. The method of claim 1, wherein determining the properties of waste disposed in the waste disposal container further comprises:
    using, by the one or more processors, a historical knowledge corpus comprising a database of chronological waste disposal data associated with one or more geographic locations.

4. The method of claim 1, wherein the collected data comprises a plurality of images associated with the waste disposal site, and the determined properties of the waste disposed in the waste disposal container comprises at least one of an amount of waste being disposed in the waste disposal site, a frequency of waste disposal in the waste disposal location, an amount of waste located in surrounding areas that can be a potential source of contamination, geographic coordinates, temporal information, and a class and a size of the waste disposed within the waste disposal container and in areas surrounding the waste disposal site.

5. The method of claim 1, wherein the vulnerability index indicates a possibility of the waste disposal site becoming a source of contamination for nearby areas in presence of unfavorable weather conditions.

6. The method of claim 1, wherein the waste disposal container located in the waste disposal site comprises a smart bin including one or more sensors to measure fill levels.

7. The method of claim 1, further comprising:
    determining, by the one or more processors, whether the protective cover is one of a temporary cover or a permanent cover.

8. The method of claim 1, further comprising:
    performing, by the one or more processors, the 3D printing in a modular fashion at or near the waste disposal container such that the printed cover is positioned on the waste disposal container by waste removal robots, wherein the 3D printer comprises a robotic 3D printer with self-moving and printing capabilities.

9. A computer system for waste management, comprising:
    one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
    collecting, by one or more processors, data corresponding to a waste disposal site from a plurality of data acquisition sources;
    based on the collected data, determining, by the one or more processors, properties of waste disposed in a waste disposal container located in the waste disposal site;
    determining, by the one or more processors, a waste distribution pattern associated with waste accumulation in the waste disposal site, the waste distribution pattern being determined based, at least in part, on the determined properties of the disposed waste, geographic data, demographic data, and consumption patterns associated with the waste disposal site;
    obtaining, by the one or more processors, weather data corresponding to a geographic location of the waste disposal site;
    based on the waste distribution pattern and the obtained weather data indicating a defined weather condition, calculating, by the one or more processors, a vulnerability index for the waste disposal site, the vulnerability index indicating a likelihood of the waste disposed in the waste disposal container overflowing due to the defined weather condition and becoming a contamination source for the waste disposal site; and
    based on the vulnerability index exceeding a predefined threshold, sending, by the one or more processors, a request to a 3D printer for printing a protective cover for the waste disposal container according to, at least in part, the waste distribution pattern, the protective cover preventing the disposed waste spreading outside the waste disposal container.

10. The computer system of claim 9, wherein the plurality of data acquisition sources comprises at least one of a camera system located at or near the waste disposal site, Internet of Things devices located at or near the waste disposal site, an unmanned aerial vehicle, and satellite-based system.

11. The computer system of claim 9, wherein determining the properties of waste disposed in the waste disposal container further comprises:
using, by the one or more processors, a historical knowledge corpus comprising a database of chronological waste disposal data associated with one or more geographic locations.

12. The computer system of claim 9, wherein the collected data comprises a plurality of images associated with the waste disposal site, and the determined properties of the waste disposed in the waste disposal container comprises at least one of an amount of waste being disposed in the waste disposal site, a frequency of waste disposal in the waste disposal location, an amount of waste located in surrounding areas that can be a potential source of contamination, geographic coordinates, temporal information, and a class and a size of the waste disposed within the waste disposal container and in areas surrounding the waste disposal site.

13. The computer system of claim 9, wherein the vulnerability index indicates a possibility of the waste disposal site becoming a source of contamination for nearby areas in presence of unfavorable weather conditions.

14. The computer system of claim 9, wherein the waste disposal container located in the waste disposal site comprises a smart bin including one or more sensors to measure fill levels.

15. The computer system of claim 9, further comprising:
determining, by the one or more processors, whether the protective cover is one of a temporary cover or a permanent cover.

16. The computer system of claim 9, further comprising:
performing, by the one or more processors, the 3D printing in a modular fashion at or near the waste disposal container such that the printed cover is positioned on the waste disposal container by waste removal robots, wherein the 3D printer comprises a robotic 3D printer with self-moving and printing capabilities.

17. A computer program product for waste management, comprising:
one or more computer readable storage media, and program instructions collectively stored on the one or more computer readable storage media, the program instructions comprising:
program instructions to collect, by one or more processors, data corresponding to a waste disposal site from a plurality of data acquisition sources;
based on the collected data, program instructions to determine, by the one or more processors, properties of waste disposed in a waste disposal container located in the waste disposal site;
program instructions to determine, by the one or more processors, a waste distribution pattern associated with waste accumulation in the waste disposal site, the waste distribution pattern being determined based, at least in part, on the determined properties of the disposed waste, geographic data, demographic data, and consumption patterns associated with the waste disposal site;
program instructions to obtain, by the one or more processors, weather data corresponding to a geographic location of the waste disposal site;
based on the waste distribution pattern and the obtained weather data indicating a defined weather condition, program instructions to calculate, by the one or more processors, a vulnerability index for the waste disposal site, the vulnerability index indicating a likelihood of the waste disposed in the waste disposal container overflowing due to the defined weather condition and becoming a contamination source for the waste disposal site; and
based on the vulnerability index exceeding a predefined threshold, program instructions to send, by the one or more processors, a request to a 3D printer for printing a protective cover for the waste disposal container according to, at least in part, the waste distribution pattern, the protective cover preventing the disposed waste spreading outside the waste disposal container.

18. The computer program product of claim 17, wherein the plurality of data acquisition sources comprises at least one of a camera system located at or near the waste disposal site, Internet of Things devices located at or near the waste disposal site, an unmanned aerial vehicle, and satellite-based system.

19. The computer program product of claim 17, wherein program instructions to determine the properties of waste disposed in the waste disposal container further comprises:
program instructions to use, by the one or more processors, a historical knowledge corpus comprising a database of chronological waste disposal data associated with one or more geographic locations.

20. The computer program product of claim 17, wherein the collected data comprises a plurality of images associated with the waste disposal site, and the determined properties of the waste disposed in the waste disposal container comprises at least one of an amount of waste being disposed in the waste disposal site, a frequency of waste disposal in the waste disposal location, an amount of waste located in surrounding areas that can be a potential source of contamination, geographic coordinates, temporal information, and a class and a size of the waste disposed within the waste disposal container and in areas surrounding the waste disposal site.

* * * * *